No. 625,920. Patented May 30, 1899.
W. BALLERSTEDT.
TRAVELING LAWN SPRINKLER.
(Application filed July 27, 1898.)
(No Model.) 3 Sheets—Sheet 2.

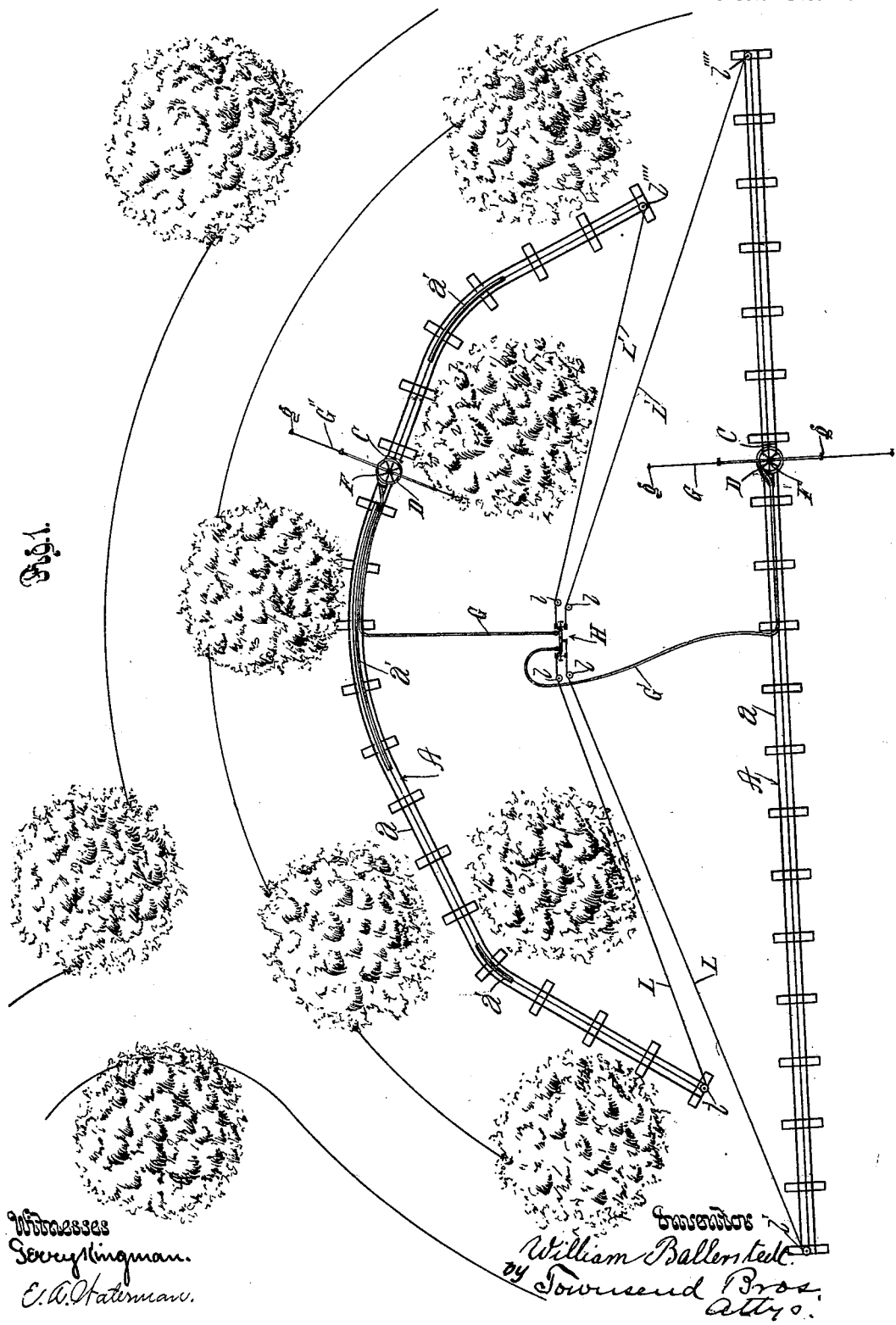

Witnesses
Inventor
William Ballerstedt
by Townsend Bros
his attys

No. 625,920. Patented May 30, 1899.
W. BALLERSTEDT.
TRAVELING LAWN SPRINKLER.
(Application filed July 27, 1898.)
(No Model.) 3 Sheets—Sheet 3.
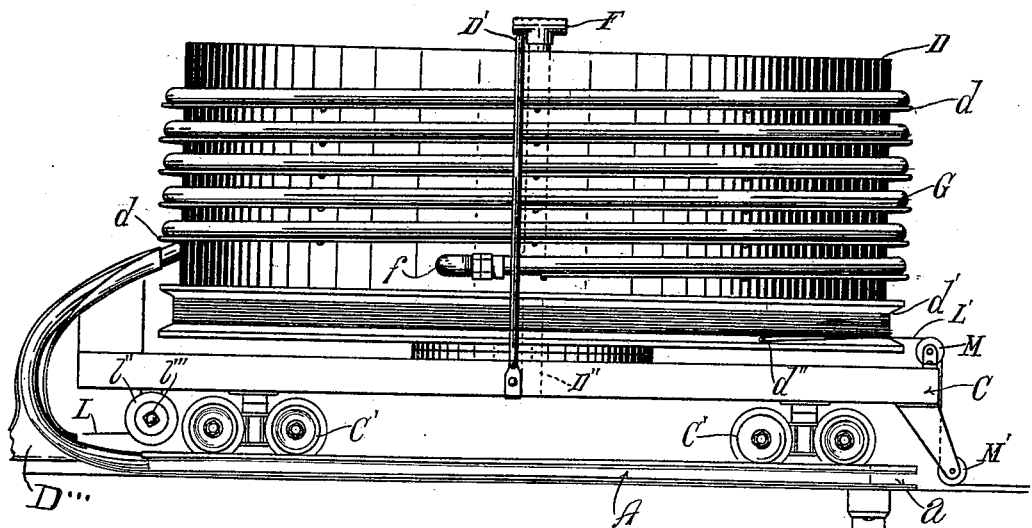
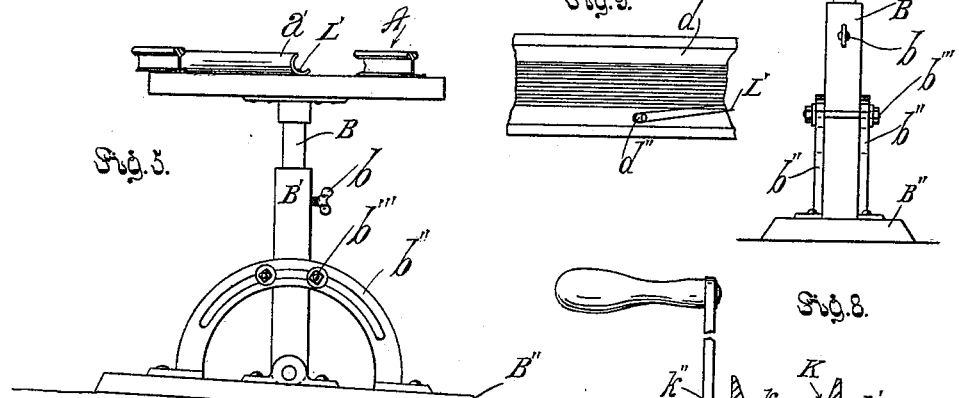
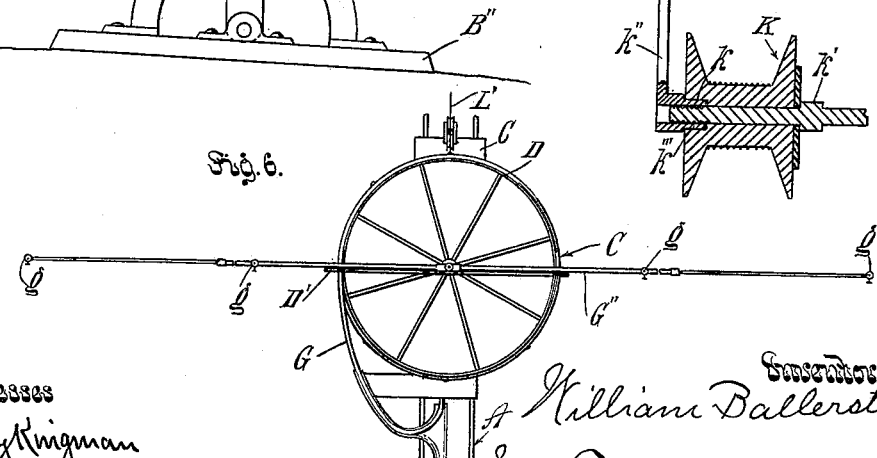
THE NORRIS PETERS CO., PHOTO-LITHO., WASHINGTON, D. C.

UNITED STATES PATENT OFFICE.

WILLIAM BALLERSTEDT, OF LOS ANGELES, CALIFORNIA.

TRAVELING LAWN-SPRINKLER.

SPECIFICATION forming part of Letters Patent No. 625,920, dated May 30, 1899.

Application filed July 27, 1898. Serial No. 687,018. (No model.)

*To all whom it may concern:*

Be it known that I, WILLIAM BALLERSTEDT, a citizen of the United States, residing at Los Angeles, in the county of Los Angeles and State of California, have invented a new and useful Traveling Lawn-Sprinkler, of which the following is a specification.

In practicing my profession, which is that of landscape gardener, I always wish to avoid flat surfaces and regular arrangement of trees and plants, thereby giving to the landscape a more natural appearance than is possible where the ground is perfectly smooth and level and the trees are arranged with regularity. I have found, however, that owing to the difficulty in sprinkling the ground and maintaining it in a properly-irrigated condition great objection exists to a lawn having a rolling surface, a rolling lawn of any great extent requiring the services of several attendants in order to shift the sprinklers, as occasion may require, in order that certain portions of the lawn may not be irrigated too much and other portions not enough.

One object of my invention is to produce a device whereby a single attendant may properly care for several times as much lawn, garden, or other ground requiring irrigation by sprinkling as is possible without the use of my invention.

Another object of my invention is to provide a traveling lawn-sprinkler which will be particularly suitable for use upon rolling lawns, one in which the motive power may be furnished either by gravity or by the water flowing to the sprinkler and in which the travel of the car will be accurately controlled by the motor, the motor not only operating to pull the car forward in case the inclination of the track is not sufficient to cause the car to travel by gravity, but also operating a flexible connection to wind the hose upon and unwind it from a reel and also operating a flexible connection which prevents the car from traveling forward too fast.

My invention comprises the various features of construction and combinations of parts, hereinafter fully set forth and claimed, whereby I carry my invention into practice.

The accompanying drawings illustrate my invention.

Figure 2:
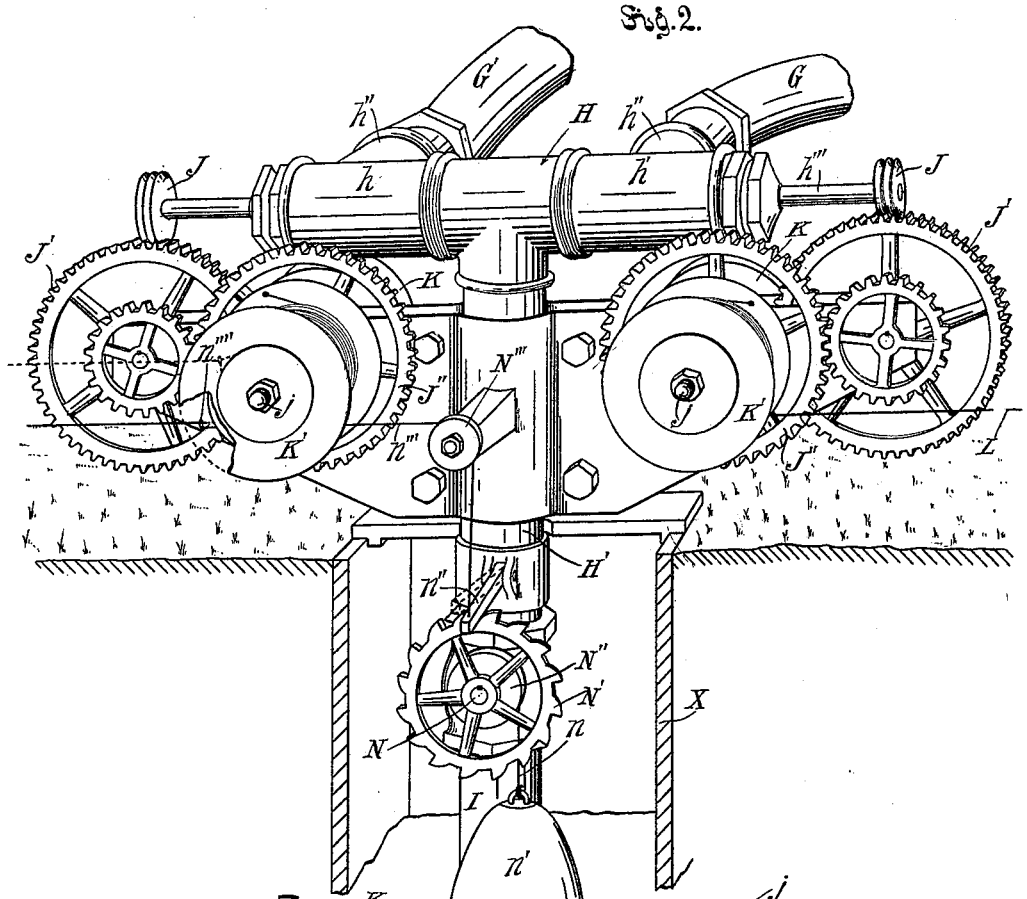
Figure 3:
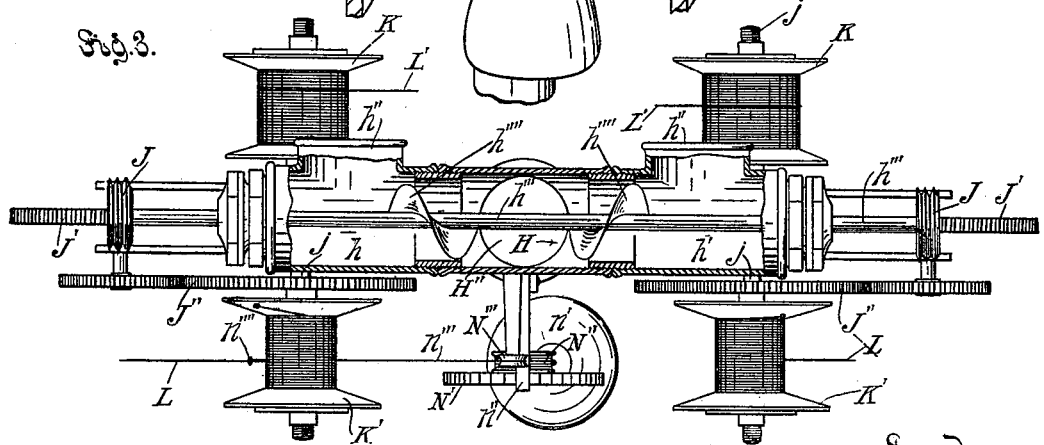
Figure 1:
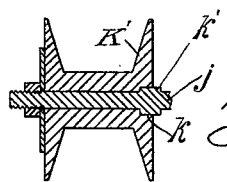

Figure 1 is a plan view of a lawn with shade trees, showing my invention applied thereto. Fig. 2 is a perspective view of my improved motor with its cut-off attachment. Fig. 3 is a plan view of the same, partly in section to expose the interior construction. Fig. 4 is a fragmental side elevation of the supporting-track, the car mounted thereupon, the hose-reel mounted upon the car, and the hose coiled upon the reel. Fig. 5 is a front elevation of one of my improved supports for the track. Fig. 6 is a plan view of a car and hose-reel, showing five sprinklers thereupon instead of the one shown in Fig. 4. Fig. 7 is a sectional view of one of the drums and the shaft upon which it is mounted. Fig. 8 is a like view showing the drum in reversed position upon the shaft and a crank applied to rotate the drum to wind or unwind the wire from the drum. Fig. 9 is an enlarged fragmental view illustrating the manner in which the same flexible connection operates to rotate the hose-reel in one direction during one half of its forward travel and to rotate it in the reverse direction during the last half of its forward travel.

In the drawings, A represents a track which may be made in sections $a$, supported by standards B, which are each telescopically mounted in a socket B', controlled by a set-screw $b$ to give vertical adjustment, and pivoted to a base B'' to give lateral adjustment. Parallel slotted guide members $b''$ with bolts $b'''$ furnish means for adjusting the standard with relation to the base so that the base may stand upon an incline, as shown in Fig. 5, and the standard adjusted to bring it into a vertical position, thereby bringing the track into exact horizontal position, although the ground may be uneven. If deemed desirable, the standards may be made permanent by being set into the ground; but I prefer to provide each standard with a base, since it may then be readily removed from place to place.

C is a car which is mounted upon trucks C', adapted to travel upon the track. Upon this car is mounted a rotatable hose-reel D, which is provided with hose-supporting ledges $d$, upon which the hose rests in its coiled position, as indicated in Fig. 4.

D' is a guide which is secured to the car so close to the ledges $d$ as to prevent the hose from passing between the guide and the ledges, thus insuring that the hose will enter into its seat upon the ledges. A pivot D'' pivots the reel to the car so that it will rotate in a horizontal plane.

F represents a sprinkler which is mounted upon the hose-reel and is provided with a pipe $f$, which runs to the exterior of the reel and to which the hose G is connected.

H represents the motor which operates to move the car along the track. This motor, as shown, comprises a stand-pipe H', adapted to be secured upon the hydrant-pipe I and provided at its top with two branches $h\ h$, each having a discharge-outlet $h'$, to which the two hose G G' are connected, for a reason hereinafter explained—that is to say, I prefer to make each motor duplicate and to provide two tracks and two reels in the manner shown in Fig. 1 of the drawings, one of the tracks being curved and the other track being straight, but the length of the tracks being equal, so that the same motor may operate the cars upon each line of track without necessitating the use of large spools for one and small spools for the other. This motor is provided with a worm-shaft $h'''$, passing longitudinally through the chamber formed by the members $h\ h''$ and provided with reversely-arranged propeller-screws $h''''$, arranged, respectively, between the inlet H'' and the respective outlets to the hose G G', so that the water flowing in either direction will operate to rotate the shaft in the same direction. By this arrangement the end thrust of one propeller is counteracted by the end thrust of the other propeller, and much friction is thereby avoided.

J represents worm-screws which are secured upon each end of the shaft and each mesh with a worm-wheel J', which in turn is geared back to operate a gear-wheel J'', which is mounted upon a shaft $j$, upon which are mounted two spools or drums K K', respectively. These spools are each provided at one end with an angular recess $k$, which fits upon an angular shoulder $k'$, provided upon the shaft, so that such spools are thereby arranged to turn with the shaft. As shown in Fig. 8, when it is desired to rotate the spools without rotating the shaft the nut is removed from the end of the shaft, the spool is removed and replaced in reverse position upon the shaft, as shown in Fig. 8, and a wrench $k''$, having a square boss $k'''$, is slipped upon the end of the shaft, and the boss is inserted into the socket in the spool, and the spool may then be revolved by means of the crank.

L represents a wire which has one end secured to one of the drums K' near the rim thereof, is wound upon the drum K', and led thence around a pulley $l$ and a second pulley $l'$, arranged at one end of the track, and is then fastened to the end of the car, as shown in Fig. 4. A drum $l''$, normally secured from rotating by means of a clamp-nut $l'''$, is provided upon the car to take up any slack of the line, or, in other words, to regulate the length of line, so that when the car reaches its limit of travel the wire L will all be unwound from the drum K'. A second wire or other flexible connection L' passes in the opposite direction from the wire L around a supporting-pulley $l$ and another pulley $l''''$, arranged at the other end of the track, thence back, and is wound about the lower part of the reel D, which is provided with a flanged groove $d'$ to receive the wire. Guiding-pulleys M M' are arranged to hold the wire closely in position to enter trough-shaped wire-guides $a'$, which are arranged at the curved portions of the track to thereby prevent the wire from drawing straight across such curves when pulled taut.

In order to provide means whereby the flow of water may be automatically stopped when the car reaches its extreme limit of travel, I provide the valve-stem N with a ratchet-wheel N' and an operating-drum N'', about which is wound a thin wire $n$, the other end of which is attached to a weight $n'$. A dog or catch $n''$ is secured to the hydrant and is arranged to normally engage the ratchet-wheel N' to hold the valve open, and an operating-wire $n'''$ is secured at one end to the dog, passes upward over a pulley N''', and is provided at its end with a ring $n''''$, which slides upon the wire L. Thus when the car reaches its extreme limit of travel and the wire L is all unwound from the drum K' by reason of the wire being secured to the rim of the drum it will assume the position indicated in dotted lines in Fig. 2, and will thereby pull the ring upward and forward, pulling upon the wire $n'''$ and lifting the dog $n''$ from its engagement with the ratchet-wheel, thus releasing the weight $n'$ and allowing such weight to rotate the drum N'' and close the valve, thus shutting off the flow of water.

As shown in Fig. 2, the hydrant is chambered within a box X, sunk in the ground, so that when the motor is removed from the hydrant the box may be covered and the hydrant concealed.

In order to provide means whereby a single length of hose may be utilized upon a track of practically double the length of the hose, I arrange the hydrant I practically at the midlength of the track and secure the motor to the hydrant. The hose G leads from the hydrant out to the track, and when it is desired to start the device in operation the hose is all unwound from the reel, and the car, with the reel mounted thereupon, is arranged at that end of the track where the pulley $l'$ is arranged.

By means of the telescoping standards the track is given a grade running from the pulley $l'$ of about one foot in one hundred or sufficient to cause the car to run down the track from the force of gravity. When this is done, the motor operates to reel and unreel the hose, but otherwise acts simply as a regulator to control the travel of the car. The drum K' is practically one-half the diameter of the drum K, and since both drums are rotated by the same shaft the drum K will wind up practically twice the amount of wire which can be wound upon the drum K' by the same number of revolutions. The wire L' is arranged to wind upon the drum K when the motor is in operation, and the wire L is arranged to unwind from the drum K' when the motor is in operation. As before stated, the track A is arranged, preferably, at a gentle inclination from the end at which the pulley l' is arranged to the other end thereof, so that the car will travel easily therealong. In order to prevent the car from traveling too fast, the wire L is attached to the rear end of the car, and in order to insure that the car will travel forward the wire L' is wound about the reel, as shown. Thus the operation of the motor will wind the wire L' upon the drum K twice as fast as the wire will unwind from the drum K'. Thus in addition to pulling the car forward the wire L' will also rotate the reel by unwinding a portion of the wire therefrom. This rotation of the reel will wind the hose G upon the reel, a suitable guide D''' being attached to the car to guide the hose from the track upward into position to rise easily into the grooves or ledges d, formed for its reception, the guide D' insuring that it enter the seats between the ledges.

Everything being in readiness, the hose being unwound from the reel and the car arranged at the highest end of the track, which is that end of the track at which the pulley l' is situated, water is turned on to flow through the hose G to the sprinkler. In flowing past the screws h'''' such screws are rotated, thus rotating the worm-screws J, and thereby rotating the drums K and K'. The wire L' operates to pull the car forward, while the wire L, being unwound only half as fast, tends to hold the car from traveling forward. This causes the wire L' to unwind from the reel twice as fast as the reel travels forward and to thereby wind the hose upon the reel as fast as the car travels forward. Enough of the wire L' is wound about the reel in one direction to pull the car and to rotate the reel to wind the hose thereupon until the car reaches a point substantially opposite the motor H, and at such point the wire is looped over a pin d' and is wound in the reverse direction, so that the further winding of the wire from the reel will draw the loop from the pin and rotate the reel in the opposite direction, thereby unwinding the hose from the reel. When the car has reached the extreme limit of its travel, the wire L is all unwound from the drum K', and as the forward movement of the car draws the wire L taut it pulls the ring n'''' upward, as indicated in dotted lines in Fig. 2, thereby lifting the dog n'' and releasing the weight n', which, acting through the drum N'', closes the valve and shuts off the flow of water.

In Fig. 6 I have shown a pipe G'' projecting upon each side of the reel D and having sprinklers g arranged thereupon, so that where there are no trees or other obstructions to engage the pipe the device will sprinkle a wide strip during its travel along the track. This pipe may project twenty feet from each side of the reel and sprinkle a strip fifty feet in width.

Thus with my improved apparatus when the track is placed in position the water may be turned on and the motor thus set in operation, and the gardener may then attend to other matters, the sprinkler traveling along the track and thoroughly and evenly irrigating or sprinkling a strip along both sides of the track. When the device reaches the other end of the track, the water is automatically cut off, as hereinbefore described, so that inattention upon the part of the gardener will not result in flooding the land or wasting the water.

Now, having described my invention, what I claim as new, and desire to secure by Letters Patent, is—

1. In a lawn-sprinkling device, the combination of a track; a car adapted to travel upon such track; a hose-reel mounted upon the car; a sprinkler carried by the hose-reel; a hose connected at one end with the sprinkler, and at the other end with a hydrant, and adapted to wind upon and to be unwound from the reel as the car travels along the track; a flexible connection to control the forward motion of the car; a flexible connection adapted to rotate the reel and to pull the car forward; and a motor adapted to unwind the flexible connection which controls the forward movement of the car, and to wind up the other flexible connection.

2. In a sprinkler, the combination of a track; a car adapted to travel upon such track; a hose-reel rotatably mounted upon the car; a sprinkler mounted upon the reel; a hose connected at one end with the sprinkler and at the other end with a hydrant and adapted to wind upon and be unwound from the reel; a stationary motor operated by the water flowing to the sprinkler; a flexible connection leading from the motor to the reel and adapted to pull the car forward and to rotate the hose-reel; and means for controlling the forward motion of the car.

3. In a sprinkler, the combination set forth of a track; a car adapted to travel along the track; a hose-reel rotatably mounted upon the car; a sprinkler mounted upon the reel; a hose, connected at one end with the sprinkler, and at the other end with a hydrant, and adapted to be wound upon and unwound from the reel; and a motor adapted to rotate the reel to wind and unwind the hose from the reel, and to move the car along the track.

4. In a sprinkler, the combination of a track; a car adapted to travel along such track; a hose-reel rotatably mounted upon the car; a sprinkler mounted upon the reel; a hose having one end connected with the sprinkler, and its other end connected with a hydrant; a motor arranged at the hydrant and adapted to be operated by the water flowing to the sprinkler; two drums operated by the motor; a flexible connection wound upon one drum, thence over a pulley at one end of the track and secured to the car; and a flexible connection secured to and adapted to wind upon the other drum, thence passed around a pulley at the other end of the track, thence to the car and wound about the hose-reel, this last-named drum being adapted to wind up its flexible connection faster than the other drum unwinds its flexible connection.

5. In a traveling lawn-sprinkler, the combination of a car; a hose-reel rotatably mounted upon such car; a sprinkler mounted upon the reel; a motor adapted to be secured to a hydrant; a hose connected at one end with the sprinkler and at the other end to the discharge-outlet of the motor; and a flexible connection secured at one end to the motor, and at its other end to the hose-reel, and adapted to pull the car and to rotate the reel to wind the hose thereupon as the car travels forward.

6. In a traveling lawn-sprinkler, the combination of a car; a sprinkler mounted upon the car; a hydrant; a motor secured to the hydrant; a hose connected at one end with the sprinkler, and at its other end with the discharge-outlet of the motor; a drum operated by the motor; and a flexible connection secured at one end to the car, and at the other end to the drum, and adapted to wind upon the drum and to pull the car forward.

7. In a traveling sprinkler, the combination set forth of a track; a car mounted to travel upon said track; a hose-reel rotatably mounted upon said car; a sprinkler carried by said car; a hydrant, located near the mid-length of said track; a motor attached to said hydrant and adapted to be operated by water flowing therethrough; a hose leading from the discharge-outlet of the motor to the sprinkler, and adapted to wind upon the reel; two drums, operated by the motor; a flexible connection, wound upon one drum, passing thence around a pulley at one end of the track and secured to the car; and a flexible connection secured at one end to the other drum, passed thence around a pulley located at the other end of the track, to the car, wound about the reel in one direction to wind the hose upon the reel, then looped over a pin and wound about the reel in the other direction to unwind the hose from the reel, and having its end secured to the reel.

8. In a traveling lawn-sprinkler, the combination set forth of a track; a car mounted to travel upon the track; means for propelling the car along the track; a hydrant provided with a cut-off; a motor adapted to be operated by the water flowing to the sprinkler; such sprinkler mounted upon the car; a hose connecting the sprinkler with the discharge-outlet of the motor; and a flexible connection attached at one end to the car and connected with the cut-off at its other end and adapted to operate the cut-off when the car reaches its limit of travel.

9. In a lawn-sprinkler, the combination set forth of a track; a car adapted to travel upon said track; a hydrant; a motor secured to the hydrant and adapted to be operated by the flowing water; a sprinkler mounted upon the car; a hose connecting the sprinkler with the discharge-outlet of the motor; two drums of different diameters operated by the motor; a flexible connection wound about the smaller drum, passed around a pulley at one end of the track and secured to the car; a flexible connection passed around the pulley at the other end of the track and secured to the other end of the car, the last-named flexible connection being wound about its respective drum in a direction opposite to that of the first-named flexible connection.

10. In a traveling lawn-sprinkler, the combination of the motor having an inlet and two outlets; a shaft provided with two worm-screws; worm-wheels rotated by the screws; two oppositely-arranged propellers secured to the shaft, arranged on opposite sides of the inlet and between the inlet and the two outlets.

W. BALLERSTEDT.

Witnesses:
L. SCHMIDT,
ALFRED I. TOWNSEND.